US012222876B2

(12) United States Patent
Sun et al.

(10) Patent No.: US 12,222,876 B2
(45) Date of Patent: Feb. 11, 2025

(54) METHOD FOR GENERATING INFORMATION BASED ON FIFO MEMORY AND APPARATUS, DEVICE AND MEDIUM

(71) Applicant: INSPUR SUZHOU INTELLIGENT TECHNOLOGY CO., LTD., Jiangsu (CN)

(72) Inventors: Xu Sun, Jiangsu (CN); Meng Yang, Jiangsu (CN); Qi Song, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/256,355

(22) PCT Filed: Nov. 30, 2021

(86) PCT No.: PCT/CN2021/134434
§ 371 (c)(1),
(2) Date: Jun. 7, 2023

(87) PCT Pub. No.: WO2023/035427
PCT Pub. Date: Mar. 16, 2023

(65) Prior Publication Data
US 2024/0020246 A1   Jan. 18, 2024

(30) Foreign Application Priority Data

Sep. 7, 2021   (CN) .......................... 202111040858.7

(51) Int. Cl.
*G06F 13/16* (2006.01)
*G06F 5/14* (2006.01)

(52) U.S. Cl.
CPC ............ *G06F 13/1668* (2013.01); *G06F 5/14* (2013.01); *G06F 13/1621* (2013.01)

(58) Field of Classification Search
CPC ..... G06F 13/1668; G06F 5/14; G06F 13/1621
See application file for complete search history.

(56) References Cited

U.S. PATENT DOCUMENTS

| 6,044,406 A | * | 3/2000 | Barkey | .............. | H04Q 11/0478 370/231 |
| 6,389,490 B1 | * | 5/2002 | Camilleri | .................. | G06F 5/12 710/52 |

(Continued)

FOREIGN PATENT DOCUMENTS

| CN | 1725367 A | 1/2006 |
| CN | 106776357 A | 5/2017 |

(Continued)

OTHER PUBLICATIONS

International Search report for PCT/CN2021/134434 mailed on Jun. 7, 2022.

*Primary Examiner* — Mark A Giardino, Jr.
(74) *Attorney, Agent, or Firm* — Dennemeyer & Associates LLC

(57) ABSTRACT

A method and an apparatus for generating information based on a FIFO memory, a device and a medium. In the method, a write credit score and a read credit score of a current FIFO memory are determined by a total capacity of the FIFO memory, and a write address, a read address, a write data enable signal value and a write data enable signal value of the current FIFO memory; and the write credit score represents the number of data sets that can be written into the FIFO memory normally; and the read credit score represents the number of data sets that can be read from the FIFO memory normally; and after sending the write credit score and the read credit score to a preceding-stage device, the preceding-stage device read and write data according to the write credit score and the read credit score.

20 Claims, 3 Drawing Sheets

(56) References Cited

U.S. PATENT DOCUMENTS

| | | | |
|---|---|---|---|
| 6,671,747 B1 | 12/2003 | Benkual et al. | |
| 10,437,758 B1* | 10/2019 | Mathews | G06F 13/18 |
| 2014/0164655 A1 | 6/2014 | Alfieri | |
| 2020/0050366 A1* | 2/2020 | Bavishi | G06F 3/061 |

FOREIGN PATENT DOCUMENTS

| | | |
|---|---|---|
| CN | 206431615 A | 8/2017 |
| CN | 111279327 A | 6/2020 |
| CN | 112199071 A | 1/2021 |
| CN | 112714904 A | 4/2021 |
| CN | 113126903 A | 7/2021 |
| CN | 113485672 A | 10/2021 |
| JP | 2007157162 A | 6/2007 |

* cited by examiner

METHOD FOR GENERATING INFORMATION BASED ON FIFO MEMORY AND APPARATUS, DEVICE AND MEDIUM

The present disclosure claims priority to Chinese patent application no. 202111040858.7, filed with the China National Intellectual Property Administration on Sep. 7, 2021 and entitled "Method for Generating Information Based on FIFO Memory and Apparatus, Device and Medium", which is incorporated herein by reference in its entirety.

TECHNICAL FIELD

The present disclosure relates to the field of data storage technologies, and in particular, to a method and an apparatus for generating information based on a FIFO memory, a device and a medium.

BACKGROUND

With the rapid development of microelectronic technology, First Input First Output (FIFO) memory chips are gradually and widely applied in high speed data acquisition, high speed data processing, high speed data transmission and multiprocessor processing systems due to its flexibility, convenience and efficiency characteristics. FIFO memory is a buffering link of a system, and mainly has the following functions: 1. caching continuous data streams, so as to prevent data from being lost in operations of data entry and data storage; 2. concentrating data for entry and storage, so that frequent bus operations can be avoided, and the burden on a central processing unit (CPU) is reduced; and 3. allowing the system to perform Direct Memory Access (DMA) operations, so as to increase the data transmission speed.

Currently, most digital circuits are synchronous, that is, the same clock is used to control all clock control devices, for example, control a trigger. A synchronous circuit is used as a leading design method, and mature tools thereof almost cover the whole design process of a large-scale digital integrated circuit. The operation from high-level language descriptions to a complete chip layout requires little manual intervention. The current synchronous FIFO memory generally only provides an empty/full indication signal and an almost empty/almost full indication signal on the basis of a normal read/write function, which limits the usage range of the FIFO memory to some extent. For example, when a current synchronous FIFO memory has a depth of 128 and a data bit width of 8 bit, a preceding-stage device of the FIFO memory is a Double Data Rate (DDR) controller or a peripheral component interconnect express (PCIe), when the DDR controller or the PCIe transmits data packets to the FIFO memory, because the preceding-stage data is sent continuously, at the start of data transmission, data must be transmitted continuously from the preceding stage to the following stage regardless of whether there is space in the following-stage FIFO memory for data storing. If only a part of data is transmitted in the current data packet and the following-stage FIFO memory has been in a full state, the data of the remaining part cannot be cached into the FIFO memory, or the previous data in the FIFO memory is overwritten, which causes data loss.

Currently, a general method for solving this problem is to determine an empty state of the FIFO memory, and start to write data when the FIFO memory is empty. In this case, the space into which data can be written is the capacity of the FIFO memory itself. When the FIFO memory is invoked, it is ensured that the data space of the FIFO memory is not less than the size of data written continuously by the preceding stage. However, this method has a problem of a big waste of efficiency, for example, 64 pieces of data with a data bit width of 8 bit are cached in the FIFO memory currently, and at this time, the full signal and empty signal are both 0; if the preceding stage wants to transmit a set of 32 pieces of 8 Bit data, the preceding stage can only wait until the FIFO is read as empty, i.e. the data can be read only when the empty state signal is 1, because it cannot be determined how much data has been stored in the FIFO by means of the full/empty indication signal. Therefore, this method reduces the usage efficiency of the FIFO memory.

SUMMARY

The purpose of the present disclosure is to provide a method and an apparatus for generating information based on a FIFO memory, a device and a medium.

The present disclosure provides a method for generating information based on a FIFO memory, including:
- a read address and a write address of a current FIFO memory are acquired;
- a read data enable signal value and a write data enable signal value of the current FIFO memory are acquired;
- a write credit score and a read credit score of the FIFO memory are determined by a total capacity of the FIFO memory, and the read address, the write address, the read data enable signal value and the write data enable signal value; and the write credit score represents the number of data sets that can be written into the FIFO memory normally; and the read credit score represents the number of data groups that can be read from the FIFO memory normally; and
- the write credit score and the read credit score are sent to a preceding-stage device, so that the preceding-stage device reads and writes data according to the write credit score and the read credit score.

In some embodiments, the write credit score and the read credit score of the current FIFO memory are determined by the total capacity of the FIFO memory, and the read address, the write address, the read data enable signal value and the write data enable signal value includes:
- it is judged whether the write address is less than the read address; in a case that the write address is less than the read address, the write credit score is determined according to the read address, the write address, the read data enable signal value, the write data enable signal value and a first determination rule; in a case that the write address is not less than the read address, the write credit score is determined according to the total capacity, the read address, the write address, the read data enable signal value, the write data enable signal value and a second determination rule; and
- it is judged whether the write address is less than the read address; in the case that the write address is less than the read address, the read credit score is determined according to the total capacity, the read address, the write address, the read data enable signal value, the write data enable signal value and a third determination rule; in the case that the write address is not less than the read address, the read credit score is determined according to the read address, the write address, the read data enable signal value, the write data enable signal value and a fourth determination rule.

In some embodiments, the write credit score is determined according to the read address, the write address, the read data enable signal value, the write data enable signal value and the first determination rule includes:

the write credit score is determined by the first determination rule, and the first determination rule is: the write credit score=the read address−the write address+the read data enable signal value−the write data enable signal value;

correspondingly, the write credit score is determined according to the total capacity, the read address, the write address, the read data enable signal value, the write data enable signal value and the second determination rule includes:

the write credit score is determined by the second determination rule, and the second determination rule is: the write credit score=the total capacity−the write address+the read address+the read data enable signal value−the write data enable signal value.

In some embodiments, the read credit score is determined according to the total capacity, the read address, the write address, the read data enable signal value, the write data enable signal value and the third determination rule includes:

the read credit score is determined by the third determination rule, and the third determination rule is: the read credit score=the total capacity+the write address−the read address−the read data enable signal value+the write data enable signal value;

correspondingly, the read credit score is determined according to the read address, the write address, the read data enable signal value, the write data enable signal value and the fourth determination rule includes:

the read credit score is determined by the fourth determination rule, and the fourth determination rule is: the read credit score=the write address−the read address−the read data enable signal value+the write data enable signal value.

In some embodiments, after the write credit score and the read credit score of the current FIFO memory are determined, the method further includes:

in a case that the read credit score is 0, an empty state signal is generated as 1, and in a case that the read credit score is 1, an almost empty state signal is generated as 1; and in a case that the write credit score is 0, a full state signal is generated as 1, and in a case that the write credit score is 1, an almost full state signal is generated as 1.

In some embodiments, the write credit score and the read credit score are sent to the preceding-stage device includes:

a unit value of each of the data sets is determined; and the unit value is used for representing the number of bytes of data in each of the data sets; and the write credit score and the read credit score based on each unit value are determined, and the write credit score and the read credit score based on the each unit value are sent to the preceding-stage device.

In some embodiments, the write credit score and the read credit score based on the each unit value are determined includes:

a ratio of the write credit score to each unit value is calculated, and the ratio is rounded down to obtain the write credit score based on the each unit value; and a ratio of the read credit score to each unit value is calculated, and the ratio is rounded down to obtain the read credit score based on the each unit value.

The present disclosure further provides an apparatus for generating information based on a FIFO memory, including:

a first acquisition component, configured to acquire a read address and a write address of a current FIFO memory;

a second acquisition component, configured to acquire a read data enable signal value and a write data enable signal value of the current FIFO memory;

a determination component, configured to determine a write credit score and a read credit score of the FIFO memory by a total capacity of the FIFO memory, and the read address, the write address, the read data enable signal value and the write data enable signal value; and the write credit score represents the number of data sets that can be written into the FIFO memory normally; and the read credit score represents the number of data groups that can be read from the FIFO memory normally; and a sending component, configured to send the write credit score and the read credit score to a preceding-stage device, so that the preceding-stage device reads and writes data according to the write credit score and the read credit score.

The present disclosure further provides an electronic device, including:

a memory for storing a computer program; and a processor for implementing steps of the method for generating the information based on the FIFO memory when executing the computer program.

The present disclosure further provides a computer readable storage medium, and the computer readable storage medium stores a computer program, and when the computer program is executed by a processor, steps of the method for generating the information based on the FIFO memory are implemented.

BRIEF DESCRIPTION OF THE DRAWINGS

To describe the technical solutions in the embodiments of the present disclosure or in the prior art more clearly, the following briefly introduces the drawings required for description in the embodiments or the prior art. Apparently, the drawings in the following description show merely some embodiments of the present disclosure, and a person of ordinary skill in the art may still derive other drawings from these drawings without inventive efforts.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely some rather than all of the embodiments of the present disclosure. All other embodiments obtained by a person of ordinary skill in the art based on the embodiments of the present disclosure without inventive efforts shall belong to the scope of protection of the present disclosure.

Figure 1:
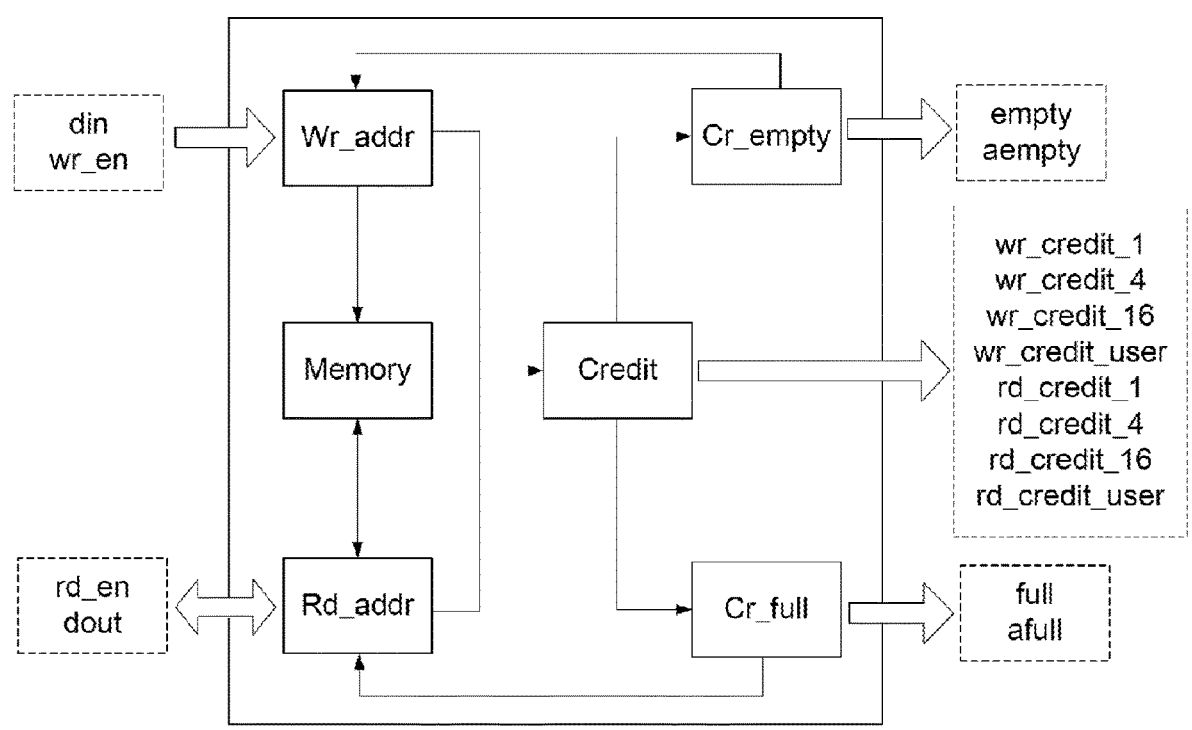
FIG. 1 is a schematic structural diagram of a system for generating information based on a FIFO memory disclosed in an embodiment of the present disclosure.

Disclosed in the embodiments of the present disclosure are a method and an apparatus for generating information based on a FIFO memory, a device and a medium, so as to increase the usage efficiency of the FIFO memory. For ease of understanding, the following introduces a system architecture to which the technical solutions of the present disclosure are applicable. FIG. 1 is a schematic structural diagram of a system for generating information based on a FIFO memory disclosed in an embodiment of the present disclosure. From FIG. 1, it can be determined that the synchronous FIFO components can be divided into the following parts when being implemented by hardware: a write address generation component Wr_addr, a read address generation component Rd_addr, a storage component Memory, a credit score generation component Credit, a component Cr_empty for generating a FIFO empty signal by means of a credit score, and a component Cr_full for generating a FIFO full signal by means of a credit score. Referring to Table 1, the interface signals of the synchronous FIFO components are described as follows:

TABLE 1

| singal | Input/output | width | Description |
|---|---|---|---|
| ClkRst | | | |
| clk | Input | [0] | input clock |
| rst | Input | [0] | reset signal, active high |
| Data input | | | |
| din | Input | [width_data-1:0] | write data |
| wr_en | Input | [0] | write data enable |
| Data output | | | |
| rd_en | Input | [0:0] | read data enable |
| dout | output | [width_data-1:0] | read data |
| Empty/full flag | | | |
| full | output | [0:0] | Fifo full flag signal |
| afull | output | [0:0] | Fifo almost full flag signal |
| empty | output | [0:0] | Fifo empty flag signal |
| aempty | output | [0:0] | Fifo almost empty flag signal |
| Credit mechanism interface | | | |
| wr_credit_user_define | input | [7:0] | user defined write credit score unit |
| wr_credit_1 | output | [7:0] | write credit score, with unit of calculation as Byte |
| wr_credit_4 | output | [7:0] | write credit score, with unit of calculation as 4 Byte |
| wr_credit_16 | output | [7:0] | write credit score, with unit of calculation as 16 Byte |
| wr_credit_user | output | [7:0] | write credit score, with unit of calculation as defined by user |
| rd_credit_user_define | input | [7:0] | user defined read credit score unit |
| rd_credit_1 | output | [7:0] | read credit score, with unit of calculation as Byte |
| rd_credit_4 | output | [7:0] | read credit score, with unit of calculation as 4 Byte |
| rd_credit_16 | output | [7:0] | read credit score, with unit of calculation as 16 Byte |
| rd_credit_user | output | [7:0] | read credit score, with unit of calculation as defined by user |

The components in FIG. 1 are described below with reference to Table 1:

1. write address generation component Wr_addr: this component generates, according to an input write enable wr_en signal, an address for writing data into a storage component. After the reset is completed, the write address is 0. When the wr_en is high, the data is written into the current Memory address, and the write address plus 1 is used as the data address for the next writing. Automatic zero clearing is performed when the write address reaches a maximum;
2. read address generation component rd_addr: this component generates, according to an input read enable rd_en signal, an address for reading data from the storage component. After the reset is completed, the read address is 0. When the rd_en is high, the current read Memory address is assigned to the read address of the following-stage storage component, and the read address plus 1 is used as the address for the next data reading. Automatic zero clearing is performed when the read address reaches a maximum;
3. storage component Memory: this component invokes or generates a synchronous dual-port static random access memory, and this storage component may be a Random Access Memory (RAM);
4. credit score generation component Credit: this component executes the method for generating information described hereinafter, and generates a write credit score and a read credit score;
5. component Cr_empty for generating the FIFO empty signal by means of the credit score: this component generates an empty state signal or an almost empty state signal according to the write credit score and the read credit score calculated by the credit score generation component Credit;
6. component Cr_full for generating the FIFO full signal by means of the credit score: this component generates a full state signal or an almost full state signal according to the write credit score and the read credit score calculated by the credit score generation component Credit.

The method for generating information based on a FIFO memory in the present solution will be specifically described below.

Figure 2:
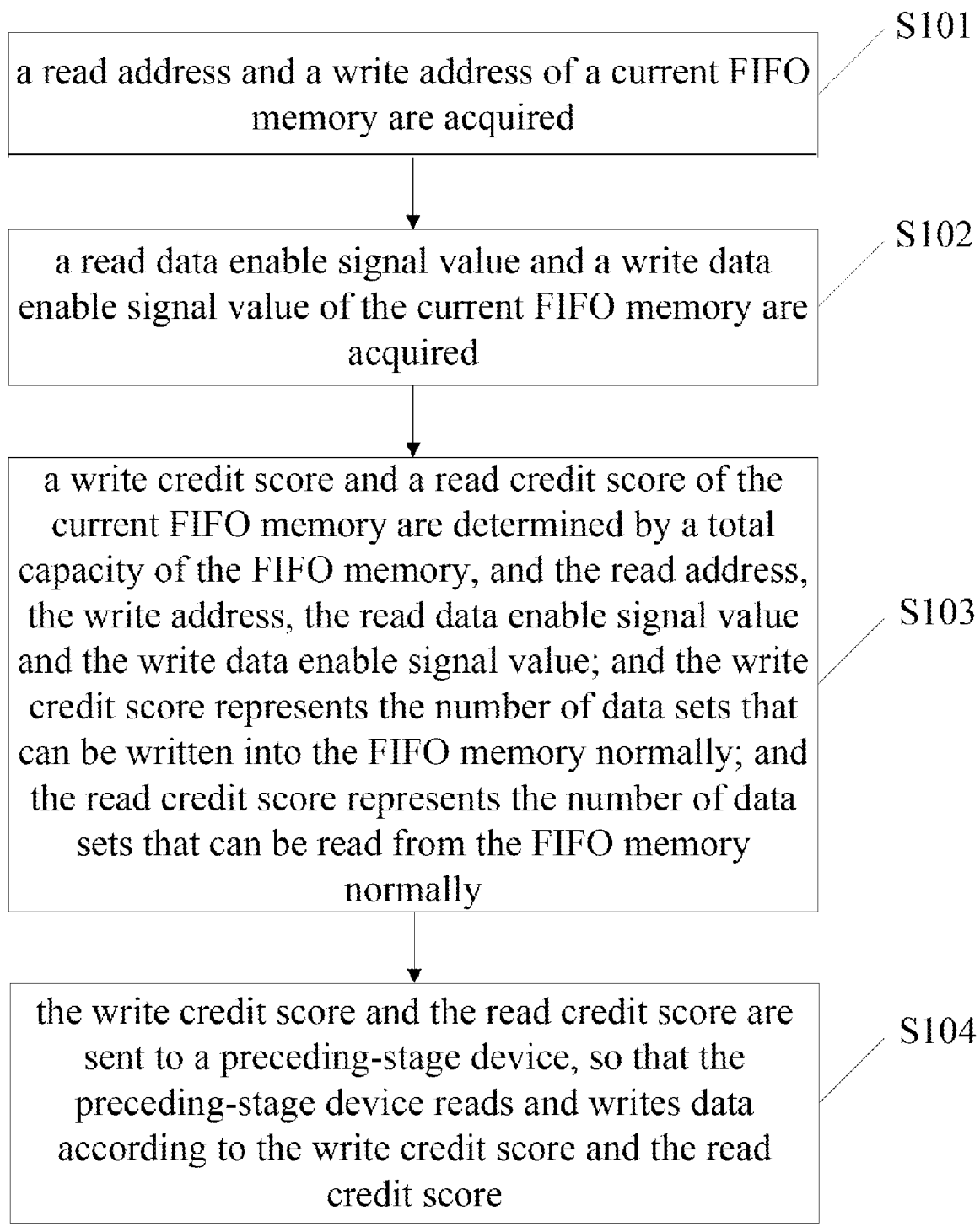
FIG. 2 is a schematic flowchart of a method for generating information based on a FIFO memory disclosed in an embodiment of the present disclosure.

FIG. 2 is a schematic flowchart of a method for generating information based on a FIFO memory disclosed in an embodiment of the present disclosure. The method includes:

S101: a read address and a write address of a current FIFO memory are acquired;

S102: a read data enable signal value and a write data enable signal value of the current FIFO memory are acquired;

specifically, in this embodiment, the read address and the read data enable signal value are acquired from the read address generation component rd_addr, and the write address and the write data enable signal value are acquired from the write address generation component Wr_addr. And, the read data enable signal value is determined according to a read data enable signal rd_en, and in a case that a received data enable signal rd_en is high, the read data enable signal value is 1, in a case that the received data enable signal is not high, the read data enable signal value is 0; similarly, the write data enable signal value is determined according to a write data enable signal wr_en, and in a case that the received write data enable signal wr_en is high, the write data enable signal value is 1, in a case that the received write data enable signal is not high, the write data enable signal value is 0. In this embodiment, the case where S101 is executed first and then S102 is executed is merely taken as an example for description, and the execution sequence of the two steps is not specifically limited, for example, the read data enable signal value and the write data enable signal value may be acquired first, then the read address and the write address are acquired, alternatively, the read data enable signal value, the write data enable signal value, the read address and the write address may also be acquired at the same time.

S103: a write credit score and a read credit score of the current FIFO memory are determined by a total capacity of the FIFO memory, and the read address, the write address, the read data enable signal value and the write data enable signal value; and the write credit score represents the number of data sets that can be written into the FIFO memory normally; and the read credit score represents the number of data sets that can be read from the FIFO memory normally;

in this embodiment, after data is written into the FIFO memory, the write address is greater than the read address; however, as data is continuously written, newly written data may overwrite the written address, and at this time, the write address starts from an initial address, and the situation where the read address is greater than the write address occurs. Therefore, in this embodiment, both cases are considered sufficiently for the process of determining the write credit score and the read credit score.

In this embodiment, the process of determining the write credit score of the current FIFO memory is as follows:
it is judged whether the write address is less than the read address; in a case that the write address is less than the read address, the write credit score is determined according to the read address, the write address, the read data enable signal value, the write data enable signal value and a first determination rule; in a case that the write address is not less than the read address, the write credit score is determined according to the total capacity, the read address, the write address, the read data enable signal value, the write data enable signal value and a second determination rule;

In some embodiments, in the present solution, the write credit score is determined by the first determination rule, and the first determination rule is: the write credit score=the read address−the write address+the read data enable signal value−the write data enable signal value; in the present solution, the write credit score is determined by the second determination rule, and the second determination rule is: the write credit score=the total capacity−the write address+the read address+the read data enable signal value−the write data enable signal value.

In this embodiment, the process of determining the read credit score of the current FIFO memory is as follows:
it is judged whether the write address is less than the read address; in the case that the write address is less than the read address, the read credit score is determined according to the total capacity, the read address, the write address, the read data enable signal value, the write data enable signal value and a third determination rule; in the case that the write address is not less than the read address, the read credit score is determined according to the read address, the write address, the read data enable signal value, the write data enable signal value and a fourth determination rule.

In some embodiments, in the present solution, the read credit score is determined by the third determination rule, and the third determination rule is: the read credit score=the total capacity+the write address−the read address−the read data enable signal value+the write data enable signal value; in the present solution, the read credit score is determined by the fourth determination rule, and the fourth determination rule is: the read credit score=the write address−the read address−the read data enable signal value+the write data enable signal value.

S104: the write credit score and the read credit score are sent to a preceding-stage device, so that the preceding-stage device reads and writes data according to the write credit score and the read credit score.

From the described solutions, it can be determined that, in the method and the apparatus for generating the information based on the FIFO memory, device and medium provided by the embodiments of the present disclosure, the write credit score and the read credit score of the current FIFO memory are determined by the total capacity of the FIFO memory, and the read address, the write address, the read data enable signal value and the write data enable signal value of the FIFO memory; and the write credit score represents the number of the data sets that can be written into the FIFO memory normally; and the read credit score represents the number of the data sets that can be read from the FIFO memory normally; and after sending the write credit score and the read credit score to the preceding-stage device, the preceding-stage device can learn, according to the write credit score and the read credit score, the number of the data sets that can be written into and read from the current FIFO memory normally, and read and write data according to the write credit score and the read credit score, thereby implementing traffic control of the system, ensuring that data does not overflow and is not jammed, and increasing the usage efficiency of the FIFO memory.

In this embodiment, a credit mechanism is a method for controlling data traffic. In the present solution, the write credit score represents the number of data sets that can be written into the synchronous FIFO normally, the read credit score represents the number of data sets that can be read from the synchronous FIFO normally, and a following stage feeds back, to an upper stage, the number of data which can be received or sent in real time or regularly, so as to realize traffic control of the whole system, and ensure that data does not overflow and is not jammed. Furthermore, in the present solution, the units of the data sets are different; if the unit value of the data sets is 1 Byte, it is represented in the present solution by the suffix of credit_1, and if the unit value of the data sets is 4 Byte/16 Byte, it is represented by the suffix of credit_4/credit_16; meanwhile, the present solution also supports a user to define the data size according to usage requirements, which is represented by the suffix of credit_user.

Therefore, in the present solution, when sending the write credit score and the read credit score to the preceding-stage device, the unit value of the data sets needs to be determined; the unit value is used for representing the number of bytes of data in each data set; and then the write credit score and the read credit score based on the each unit value are determined, and the write credit score and the read credit score based on the each unit value are sent to the preceding-stage device. And when determining the write credit score and the read credit score based on the each unit value, the specific scheme is to calculate a ratio of the write credit score to the each unit value, and round down the ratio to obtain the write credit score based on the each unit value, and calculate a ratio of the read credit score to the each unit value, and round down the ratio to obtain the read credit score based on the each unit value.

For example, the read address is set as rd_addr, the write address is set as wr_addr, the read data enable signal value is set as rd_en, and the write data enable signal value is set as wr_en. In addition, before a synchronous FIFO memory is used, a total capacity of the FIFO memory is defined, which is denoted as fifo_capa with the unit of byte.

1. The process of calculating a write credit score wr_credit is as follows:
first, comparing the wr_addr and the rd_addr;
if wr_addr=>rd_addr:
wr_credit_1=fifo_capa−wr_addr+rd_addr+rd_en−wr_en.
If wr_addr<rd_addr:
wr_credit_1=rd_addr−wr_addr+rd_en−wr_en.

In this case, the calculated wr_credit_1 is a write credit score based on the unit value of 1, and other write credit scores are calculated in the following manners:
wr_credit_4=wr_credit_1/4, rounded down;
wr_credit_16=wr_credit_1/16, rounded down; and
wr_credit_user=wr_credit_1/wr_credit_user, rounded down.

2. The process of calculating a read credit score rd_credit is as follows:
first, comparing the wr_addr and the rd_addr;
if wr_addr=>rd_addr:
rd_credit_1=wr_addr−rd_addr−rd_en+wr_en;
if wr_addr<rd_addr:
rd_credit_1=fifo_capa+wr_addr−rd_addr−rd_en+wr_en.

In this case, the calculated rd_credit_1 is a read credit score based on the unit value 1, and other read credit scores are calculated in the following manners:
rd_credit_4=rd_credit_1/4, rounded down; and
rd_credit_16=rd_credit_1/16, rounded down; and
rd_credit_user=rd_credit_1/wr_credit_user, rounded down.

It should be noted that, in this embodiment, after the write credit score and the read credit score of the current FIFO memory are determined, in a case that the read credit score is 0, an empty state signal is generated as 1, and in a case that the read credit score is 1, an almost empty state signal is generated as 1; and in a case that the write credit score is 0, a full state signal is generated as 1, and in a case that the write credit score is 1, an almost full state signal is generated as 1. It should be noted that the empty state signal, the almost empty state signal, the full state signal and the almost full state signal are all 0 by default, and are correspondingly set to be 1 only when the foregoing conditions are satisfied.

That is to say, for the Cr_empty component described above, when rd_credit_1=0 (rd_credit_1 being 0 represents that no data can be read out at this time), FIFO is in an empty state, and an empty signal is 1. When rd_credit_1=1 (rd_credit_1 being 1 represents that there is only one piece of data that can be read out at this time), FIFO is an almost empty state, and an aempty signal is 1. For the Cr_full component described above, when wr_credit_1=0 (wr_credit_1 being 0 represents that no data can be written in at this time), FIFO is in a full state, and a full signal is 1. When wr_credit_1=1 (wr_credit_1 being 1 represents that there is only one data space into which data can be written at this time), FIFO is in an almost full state, and an afull signal is 1. The empty state signal, the almost empty state signal, the full state signal and the almost full state signal generated in the present solution may also be sent to a preceding-stage device, and the preceding-stage device may still read and write data according to the foregoing signals.

In conclusion, it can be determined that the present solution essentially provides a synchronous FIFO memory having a credit mechanism interface, read and write ends generate independent credit scores and user-defined credit scores are supported. The empty and almost empty signals of the FIFO memory can be generated by means of read credit scores, and the full and almost full signals of the FIFO memory can be generated by means of write credit scores. The method allows the preceding-stage device to directly learn, by means of read and write credit scores, how many data sets can be read from and written into the FIFO memory, without the need of separate calculation by an external device, simplifying a calculation process of an external interface signal; in addition, the system, such as a PCIe, which supports a credit mechanism can be directly connected, improving the reusability and reliability of a synchronous FIFO component, increasing the development efficiency of an entire System on Chip (SOC), further improving product competitiveness.

The following describes an apparatus for generating information, a device and a medium provided in the embodiments of the present disclosure. For the apparatus for generating information, device, and medium described below and the information generation method described above, reference may be made to each other.

Figure 3:
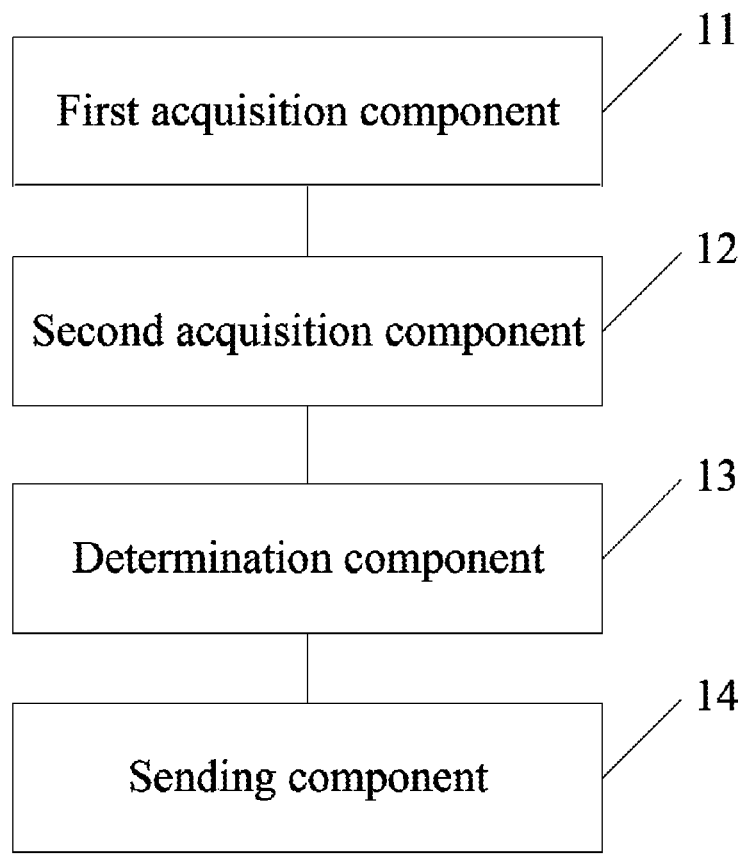
FIG. 3 is a schematic structural diagram of an apparatus for generating information based on a FIFO memory disclosed in an embodiment of the present disclosure.

FIG. 3 is a schematic structural diagram of an apparatus for generating information based on a FIFO memory disclosed in an embodiment of the present disclosure, including a first acquisition component 11, configured to acquire a read address and a write address of a current FIFO memory;
- a second acquisition component 12, configured to acquire a read data enable signal value and a write data enable signal value of the current FIFO memory;
- a determination component 13, configured to determine a write credit score and a read credit score of the FIFO memory by a total capacity of the FIFO memory, and the read address, the write address, the read data enable signal value and the write data enable signal value; and the write credit score represents the number of data sets that can be written into the FIFO memory normally; and the read credit score represents the number of data groups that can be read from the FIFO memory normally; and
- a sending component 14, configured to send the write credit score and the read credit score to a preceding-stage device, so that the preceding-stage device reads and writes data according to the write credit score and the read credit score.

The determination component includes:
a first judgment unit, configured to judge whether the write address is less than the read address; in a case that the write address is less than the read address, trigger a first determination unit; in a case that the write address is not less than the read address, trigger a second determination unit;
the first determination unit, configured to determine the write credit score according to the read address, the write address, the read data enable signal value, the write data enable signal value and a first determination rule;
the second determination unit, configured to determine the write credit score according to the total capacity, the read address, the write address, the read data enable signal value, the write data enable signal value and a second determination rule;
a second judgment unit, configured to judge whether the write address is less than the read address; in the case that the write address is less than the read address, trigger a third determination unit, and in the case that the write address is not less than the read address, trigger a fourth determination unit;
the third determination unit, configured to determine the read credit score according to the total capacity, the read address, the write address, the read data enable signal value, the write data enable signal value and a third determination rule; and
the fourth determination unit, configured to determine the read credit score according to the read address, the write address, the read data enable signal value, the write data enable signal value and a fourth determination rule.

The first determination unit is specifically configured to:
determine the write credit score by the first determination rule, and the first determination rule is:
the write credit score=the read address−the write address+ the read data enable signal value−the write data enable signal value;
correspondingly, the second determination unit is specifically configured to:
determine the write credit score by the second determination rule, and the second determination rule is:
the write credit score=the total capacity−the write address+the read address+the read data enable signal value−the write data enable signal value.

The third determination unit is specifically configured to:
determine the read credit score by the third determination rule, and the third determination rule is:
the read credit score=the total capacity+the write address− the read address−the read data enable signal value+the write data enable signal value;
correspondingly, the fourth determination unit is specifically configured to:
determine the read credit score by the fourth determination rule, and the fourth determination rule is:
the read credit score=the write address−the read address− the read data enable signal value+the write data enable signal value.

The apparatus further includes:
a first signal generation component, configured to generate an empty state signal as 1 in a case that the read credit score is 0, and generate an almost empty state signal as 1 in a case that the read credit score is 1; and
a second signal generation component, configured to generate a full state signal as 1 in a case that the write credit score is 0, and generate an almost full state signal as 1 in a case that the write credit score is 1.

The sending component includes:
a fifth determination unit, configured to determine a unit value of each of the data sets; and the unit value is used for representing the number of bytes of data in each of the data sets;
a sixth determination unit, configured to determine the write credit score and the read credit score based on each unit value; and
a sending unit, configured to send the write credit score and the read credit score based on the each unit value to the preceding-stage device.

The sixth determination unit includes:
a first calculation subunit, configured to calculate a ratio of the write credit score to the each unit value, and round down the ratio to obtain the write credit score based on the each unit value; and
a second calculation subunit, configured to calculate a ratio of the read credit score to the each unit value, and round down the ratio to obtain the read credit score based on the each unit value.

Figure 4:
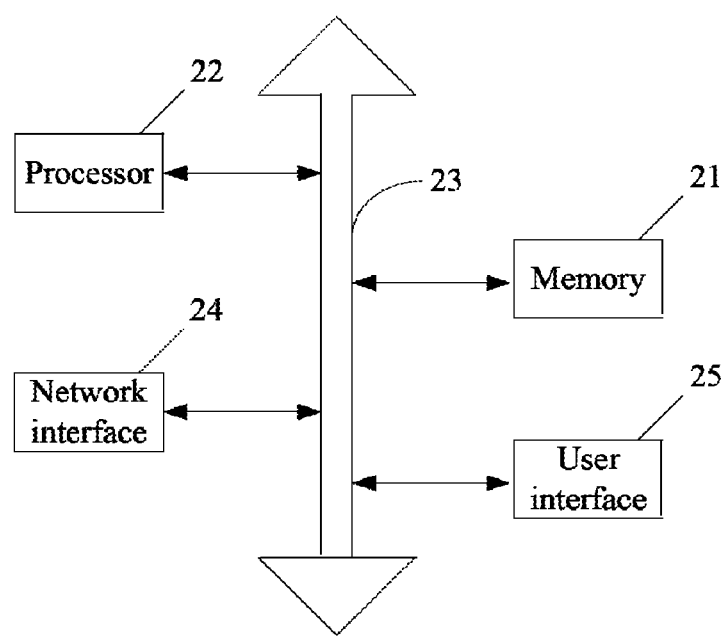
FIG. 4 is a schematic structural diagram of an electronic product disclosed in an embodiment of the present disclosure.

FIG. 4 is a schematic structural diagram of an electronic device disclosed in an embodiment of the present disclosure, including:
a memory 21 for storing a computer program; and
a processor 22 for implementing steps of the method for generating the information based on the FIFO memory in the foregoing embodiments when executing the computer program.

In this embodiment, the device may be a Personal Computer (PC), and may also be a terminal device such as a smart phone, a tablet computer, a palmtop computer, and a portable computer.

The device may include a memory 21, a processor 22 and a bus 23.

The memory 21 includes at least one type of readable storage medium, and the readable storage medium includes a flash memory, a hard disk, a multimedia card, a card-type memory (for example, an SD or DX memory), a magnetic memory, a magnetic disk, an optical disk, and so on. The memory 21 may in some embodiments be an internal storage unit of the device, for example, a hard disk of the device. In other embodiments, the memory 21 may also be an external storage device of the device, for example, a plug-in hard disk, a Smart Media Card (SMC), a Secure Digital (SD) card, and a Flash Card that are equipped on the device. Further, the memory 21 may also include both an internal storage unit of the device and an external storage device. The memory 21 may be used not only to store application software installed in the device and various types of data, such as a program code for executing the method for generating the information, but also to temporarily store data that has been output or is to be output.

In some embodiments, the processor 22 may be a Central Processing Unit (CPU), a controller, a micro controller, a microprocessor, or another data processing chip, and is configured to run a program code stored in the memory 21 or process data, such as a program code for executing the information generation method.

The bus 23 may be a peripheral component interconnect (PCI) bus, an extended industry standard architecture (EISA) bus, or the like. The bus may be classified into an address bus, a data bus, a control bus, and the like. For ease of representation, only one bold line is shown in FIG. 4, which does not mean there is only one bus or one type of bus.

Further, the device may also include a network interface 24. The network interface 24 may optionally include a wired interface and/or a wireless interface (such as a VVi-Fi interface and a Bluetooth interface), and is generally used to establish a communication connection between the device and another electronic device.

Optionally, the device may further include a user interface 25. The user interface 25 may include a Display and an input unit such as a Keyboard. The user interface 25 may optionally further include a standard wired interface and a standard wireless interface. Optionally, in some embodiments, the display may be an LED display, a liquid crystal display, a touch liquid crystal display, an Organic Light-Emitting Diode (OLED) touch device, or the like. The display may also be appropriately referred to as a display screen or a display unit, and is configured to display information processed in the device and display a visual user interface.

FIG. 4 only shows a device including components 21-25. A person skilled in the art may understand that the structure shown in FIG. 4 does not limit the device, and may include fewer or more components than those shown in the figure, or a combination of some components, or have a different component arrangement.

Further provided in the embodiments of the present disclosure is a computer readable storage medium, and the computer readable storage medium stores a computer program, and when the computer program is executed by a processor, steps of the method for generating the information based on the FIFO memory according to the described embodiments are implemented.

The storage medium may include any medium that can store program codes, such as a USB flash disk, a mobile hard disk, a Read-Only Memory (ROM), a Random Access Memory (RAM), a magnetic disk, or an optical disk.

The embodiments in this description are described in a progressive manner, each embodiment focuses on a part different from other embodiments, and reference may be made to each other for the same or similar parts of the embodiments.

The above descriptions of the disclosed embodiments enable a person skilled in the art to implement or use the present disclosure. Various modifications to these embodiments would have readily occurred to those skilled in the art. The general principles defined herein may be implemented in other embodiments without departing from the spirit or scope of the present disclosure. Accordingly, the present disclosure will not be limited to the embodiments shown herein but is to be in accord with the widest scope consistent with the principles and novel features disclosed herein.

What is claimed is:

1. A method for generating information based on a FIFO memory, comprising:
acquiring a read address and a write address of a current FIFO memory;
acquiring a read data enable signal value and a write data enable signal value of the current FIFO memory;
determining a write credit score and a read credit score of the FIFO memory by a total capacity of the FIFO memory, and the read address, the write address, the read data enable signal value and the write data enable signal value; wherein the write credit score represents the number of data sets that can be written into the FIFO memory normally; and the read credit score represents the number of data sets that can be read from the FIFO memory normally; and
sending the write credit score and the read credit score to a preceding-stage device, so that the preceding-stage device reads and writes data according to the write credit score and the read credit score.

2. The method for generating the information according to claim 1, wherein determining the write credit score and the read credit score of the FIFO memory by the total capacity of the FIFO memory, and the read address, the write address, the read data enable signal value and the write data enable signal value comprises:
judging whether the write address is less than the read address; in a case that the write address is less than the read address, determining the write credit score according to the read address, the write address, the read data enable signal value, the write data enable signal value and a first determination rule; in a case that the write address is not less than the read address, determining the write credit score according to the total capacity, the read address, the write address, the read data enable signal value, the write data enable signal value and a second determination rule; and judging whether the write address is less than the read address; in the case that the write address is less than the read address, determining the read credit score according to the total capacity, the read address, the write address, the read data enable signal value, the write data enable signal value and a third determination rule; in the case that the write address is not less than the read address, determining the read credit score according to the read address, the write address, the read data enable signal value, the write data enable signal value and a fourth determination rule.

3. The method for generating the information according to claim 2, wherein determining the write credit score according to the read address, the write address, the read data enable signal value, the write data enable signal value and the first determination rule comprises:

determining the write credit score by the first determination rule, wherein the first determination rule is: the write credit score=the read address−the write address+the read data enable signal value−the write data enable signal value;

correspondingly, determining the write credit score according to the total capacity, the read address, the write address, the read data enable signal value, the write data enable signal value and the second determination rule comprises:

determining the write credit score by the second determination rule, wherein the second determination rule is: the write credit score=the total capacity−the write address+the read address+the read data enable signal value−the write data enable signal value.

4. The method for generating the information according to claim 2, wherein determining the read credit score according to the total capacity, the read address, the write address, the read data enable signal value, the write data enable signal value and the third determination rule comprises:

determining the read credit score by the third determination rule, wherein the third determination rule is: the read credit score=the total capacity+the write address−the read address−the read data enable signal value+the write data enable signal value;

correspondingly, determining the read credit score according to the read address, the write address, the read data enable signal value, the write data enable signal value and the fourth determination rule comprises:

determining the read credit score by the fourth determination rule, wherein the fourth determination rule is: the read credit score=the write address−the read address−the read data enable signal value+the write data enable signal value.

5. The method for generating the information according to claim 2, wherein acquiring the read data enable signal value and the write data enable signal value of the current FIFO memory comprises: in a case that a received data enable signal is high, the read data enable signal value is 1, in a case that the received data enable signal is not high, the read data enable signal value is 0; and in a case that a received write data enable signal is high, the write data enable signal value is 1, in a case that the received write data enable signal is not high, the write data enable signal value is 0.

6. The method for generating the information according to claim 1, wherein after determining the write credit score and the read credit score of the FIFO memory, the method further comprises:

in a case that the read credit score is 0, generating an empty state signal as 1, and in a case that the read credit score is 1, generating an almost empty state signal as 1; and in a case that the write credit score is 0, generating a full state signal as 1, and in a case that the write credit score is 1, generating an almost full state signal as 1.

7. The method for generating the information according to claim 6, wherein the empty state signal, the almost empty state signal, the full state signal and the almost full state signal are all 0 by default.

8. The method for generating the information according to claim 6, wherein the empty state signal represents that no data can be read out at this time.

9. The method for generating the information according to claim 6, wherein the almost empty state signal represents that there is only one piece of data that can be read out at this time.

10. The method for generating the information according to claim 6, wherein the full state signal represents that no data can be written in at this time.

11. The method for generating the information according to claim 6, wherein the almost full state signal represents that there is only one data space into which data can be written at this time.

12. The method for generating the information according to claim 6, wherein the method further comprises:

sending the empty state signal, the almost empty state signal, the full state signal and the almost full state signal to the preceding-stage device, so that the preceding-stage device reads and writes data according to the empty state signal, the almost empty state signal, the full state signal and the almost full state signal.

13. The method for generating the information according to claim 1, wherein sending the write credit score and the read credit score to the preceding-stage device comprises:

determining a unit value of each of the data sets; wherein the unit value is used for representing the number of bytes of data in each of the data sets; and determining the write credit score and the read credit score based on each unit value, and sending the write credit score and the read credit score based on the each unit value to the preceding-stage device.

14. The method for generating the information according to claim 13, wherein determining the write credit score and the read credit score based on the each unit value comprises:

calculating a ratio of the write credit score to the each unit value, and rounding down the ratio to obtain the write credit score based on the each unit value; and calculating a ratio of the read credit score to the each unit value, and rounding down the ratio to obtain the read credit score based on the each unit value.

15. The method for generating the information according to claim 14, wherein calculating the ratio of the write credit score to the each unit value, and rounding down the ratio to obtain the write credit score based on the each unit value comprises:

in a case that unit value is 4, calculating wr_credit_4=wr_credit_1/4, wherein the wr_credit_4 represents the ratio, the wr_credit_1 represents the write credit score;

in a case that unit value is 16, calculating wr_credit_16=wr_credit_1/16, wherein the wr_credit_4 represents the ratio;

rounding down the ratio to obtain the write credit score.

16. The method for generating the information according to claim 14, wherein calculating a ratio of the read credit score to the each unit value, and rounding down the ratio to obtain the read credit score based on the each unit value comprises:

in a case that unit value is 4, calculating rd_credit_4=rd_credit_1/4, wherein the rd_credit_4 represents the ratio, the rd_credit_1 represents the read credit score;

in a case that unit value is 16, calculating rd_credit_16=rd_credit_1/16, wherein the rd_credit_16 represents the ratio, the rd_credit_1 represents the read credit score;

rounding down the ratio to obtain the write credit score.

17. The method for generating the information according to claim 13, wherein unit values of the data sets are different; in a case that the unit value is 1 Byte, it is represented by a suffix of credit_1, and in a case that the unit value is 4 Byte or 16 Byte, it is represented by a suffix of credit_4 or a suffix of credit_16.

18. The method for generating the information according to claim 13, wherein the method further comprises:

supporting a user to define data size according to usage requirements, which is represented by the suffix of credit_user.

19. An electronic device, comprising:

a memory for storing a computer program; and a processor, wherein when executing the computer program, the processor is configured to cause the processor to:

acquire a read address and a write address of a current FIFO memory;

acquire a read data enable signal value and a write data enable signal value of the current FIFO memory;

determine a write credit score and a read credit score of the FIFO memory by a total capacity of the FIFO memory, and the read address, the write address, the read data enable signal value and the write data enable signal value; wherein the write credit score represents the number of data sets that can be written into the FIFO memory normally; and the read credit score represents the number of data sets that can be read from the FIFO memory normally; and send the write credit score and the read credit score to a preceding-stage device, so that the preceding-stage device reads and writes data according to the write credit score and the read credit score.

20. A non-transitory computer readable storage medium, wherein the non-transitory computer readable storage medium stores a computer program, and when the computer program is executed by a processor, is configured to cause the processor to:

acquire a read address and a write address of a current FIFO memory;

acquire a read data enable signal value and a write data enable signal value of the current FIFO memory;

determine a write credit score and a read credit score of the FIFO memory by a total capacity of the FIFO memory, and the read address, the write address, the read data enable signal value and the write data enable signal value; wherein the write credit score represents the number of data sets that can be written into the FIFO memory normally; and the read credit score represents the number of data sets that can be read from the FIFO memory normally; and send the write credit score and the read credit score to a preceding-stage device, so that the preceding-stage device reads and writes data according to the write credit score and the read credit score.

* * * * *